(12) United States Patent
Chung et al.

(10) Patent No.: US 8,309,040 B2
(45) Date of Patent: Nov. 13, 2012

(54) MICROFLUIDIC CONTROL APPARATUS AND METHOD OF ASSEMBLING THE SAME

(75) Inventors: Kwang Hyo Chung, Daejeon (KR); Dae-Sik Lee, Daejeon (KR); Hyun Woo Song, Daejeon (KR); Yo Han Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 302 days.

(21) Appl. No.: 12/542,627

(22) Filed: Aug. 17, 2009

(65) Prior Publication Data

US 2010/0158761 A1 Jun. 24, 2010

(30) Foreign Application Priority Data

Dec. 23, 2008 (KR) ........................ 10-2008-0132241

(51) Int. Cl.
*B01J 8/00* (2006.01)
*B01L 3/00* (2006.01)

(52) U.S. Cl. ........ 422/603; 422/130; 422/500; 422/502; 422/504; 422/505; 29/890.09

(58) Field of Classification Search .................. 422/603, 422/130, 500, 502, 504, 505; 29/890.09
See application file for complete search history.

(56) References Cited

U.S. PATENT DOCUMENTS

| | | | |
|---|---|---|---|
| 2002/0119078 A1 | 8/2002 | Jansa et al. | |
| 2002/0127149 A1* | 9/2002 | Dubrow et al. | ............... 422/102 |
| 2003/0180965 A1* | 9/2003 | Yobas et al. | .................. 436/180 |
| 2004/0021068 A1 | 2/2004 | Staats | |
| 2006/0032746 A1 | 2/2006 | Knott et al. | |
| 2008/0131327 A1 | 6/2008 | Van Dam et al. | |

FOREIGN PATENT DOCUMENTS

| | | |
|---|---|---|
| JP | 2006-317309 | 11/2006 |
| KR | 1020080010395 A | 1/2008 |

OTHER PUBLICATIONS

K.H. Chung et al., "Automated Microfluidic Immunoassay (AMI) System Utilizing a Polymer Chip Equipped With a Blood Filter and Reagent Storage Chambers," Twelfth International Conference on Miniaturized Systems for Chemistry and Life Sciences, Oct. 2008, pp. 1699-1701.

* cited by examiner

*Primary Examiner* — Walter D Griffin
*Assistant Examiner* — Lessanework Seifu

(57) ABSTRACT

Provided is a microfluidic control apparatus that includes at least one control means and a microfluidic control chip. When the microfluidic control chip is loaded to the control means, a needle provided to the control means is inserted into a reaction solution storage chamber of the microfluidic control chip, in which the reaction solution storage chamber is sealed with a sealing tape. Thus, fluid connection is easily formed between the microfluidic control chip and the control means without leakage.

20 Claims, 7 Drawing Sheets

MICROFLUIDIC CONTROL APPARATUS AND METHOD OF ASSEMBLING THE SAME

CROSS-REFERENCE TO RELATED APPLICATIONS

This U.S. non-provisional patent application claims priority under 35 U.S.C. §119 of Korean Patent Application No. 10-2008-0132241, filed on Dec. 23, 2008, the entire contents of which are hereby incorporated by reference.

BACKGROUND OF THE INVENTION

The present invention relates to a microfluidic control apparatus and a method of assembling the microfluidic control apparatus, and more particularly, to a microfluidic control apparatus including a control means and a microfluidic control chip that stores a reaction solution.

Research has been actively carried out on microfluidic control chips that are tools for performing biochemical reactions thereon. To use a microfluidic control chip as a biochemical reactor, the microfluidic control chip should be adapted to induce fluids including a reaction solution, a sample, and a buffer into the microfluidic control chip, and to perform various microfluid-controlling operations, including mixing, transferring, branching, separating, and washing, at the microfluidic control chip. The microfluid-controlling operations are performed at the microfluidic control chip with various control methods according to applied force such as mechanical force, pneumatic pressure, hydraulic force, surface tension, gravity, magnetic force, electric force, optical denaturation force, chemical reaction force, and thermal stress.

In addition, research has been carried out on microfluidic control apparatuses that include a microfluidic control chip and an external control means to induce or supply fluids including a reaction solution, a sample, and a buffer into the microfluidic control chip. Such microfluidic control apparatuses are realized with the various control methods according to applied force.

A microfluidic control apparatus is required to accurately control, through a large-volume, external fluidal control means, a micro volume of fluid in a microfluidic control chip. To this end, it is necessary to seal the control means and the microfluidic control chip and to prevent volume loss thereof. It is also necessary to easily detach and attach the microfluidic control chip from and to the control means to enable use of disposable microfluidic control chips.

SUMMARY OF THE INVENTION

The present invention provides a microfluidic control apparatus configured to easily and conveniently connect an external control means with a microfluidic control chip storing reaction solution, in the state of keeping the sealing of the microfluidic control chip.

The present invention also provides a microfluidic control apparatus configured to store reaction solution in a microfluidic control chip without the evaporation of the reaction solution.

The present invention also provides a microfluidic control apparatus configured to easily attach and detach a microfluidic control chip to and from at least one control means to use disposable microfluidic control chips.

Embodiments of the present invention provide microfluidic control apparatuses including a microfluidic control chip and at least one control means that controls the microfluidic control chip.

The microfluidic control chip includes: at least one reaction solution storage chamber sealed by a sealing tape; at least one branch microchannel having a first end that is connected to the reaction solution storage chamber; and a main microchannel connected to a second end of the branch microchannel.

The control means includes at least one needle penetrating the sealing tape.

The microfluidic control chip provides a working fluid through the needle to the reaction solution storage chamber, and a reaction solution in the reaction solution storage chamber moves to the branch microchannel to control the flow of the microfluid.

In some embodiments, the reaction solution storage chamber may have a side that is provided with an opening sealed with the sealing tape, and another side that communicates with the first end of the branch microchannel. The opening may be circular and have a diameter that is greater than an outer diameter of the needle.

In other embodiments, the sealing tape may include one of a tape having a surface to which adhesive is applied, and a tape having both surfaces to which adhesive is applied.

In still other embodiments, the control means may include a sealing elastic plate that is in contact with the sealing tape, and the needle may pass tightly through the sealing elastic plate to be fixed to the sealing elastic plate.

In even other embodiments, the needle may protrude through the sealing elastic plate, a protrusion length of the needle from the sealing elastic plate may be greater than a thickness of the sealing tape, and a front end of the needle may be disposed in the reaction solution storage chamber.

In yet other embodiments, the sealing elastic plate may be formed of one of silicone rubber, acryl rubber, fluoro rubber, hypalon rubber, butyl rubber, nitrile rubber, butadiene rubber, chloroprene rubber, and poly-dimethyl siloxane.

In further embodiments, the branch microchannel having the second end may be provided in plurality, and the main microchannel may be connected to the second ends of the branch microchannels.

In still further embodiments, the microfluidic control chip may include stop valves that are disposed between the main microchannel and the second ends of the branch microchannels. The stop valve may include a microvalve that prevents the reaction solution from flowing to the main microchannel.

In even further embodiments, a tube may be connected to the needle, and the working fluid may flow in the tube, and a pump may be connected to the tube to pump the working fluid.

In yet further embodiments, the tube may include a single main tube, and a plurality of sub-tubes that are formed by branching the main tube and connected to a plurality of needles. The sub-tubes may have different inner diameters so as to have different flow rates.

In much further embodiments, the working fluid may include one of air, water, oil, and a combination thereof. The reaction solution storage chamber may have an inner space, a portion of which is filled with the reaction solution, and a rest of which is filled with air.

In still much further embodiments, the control means is connected in one-to-one correspondence to the reaction solution storage chamber, and reaction solutions respectively filling the reaction solution storage chambers are classified into at least two types. The microfluidic control chip may include a connection microchannel that is disposed between the reaction solution storage chambers to mix the reaction solutions that are stored respectively in the reaction solution storage chambers.

In even much further embodiments, the branch microchannels connected to the reaction solution storage chambers may have different shapes and sizes to have different flow resistances.

In other embodiments of the present invention, methods of assembling a microfluidic control apparatus include: preparing a microfluidic control chip that includes at least one reaction solution storage chamber sealed with a sealing tape; preparing at least one control means that includes at least one needle and a pump that is connected to the needle to pump a working fluid into the needle; and inserting the needle through the sealing tape such that an end of the needle is disposed in the reaction solution storage chamber, so as to connect the microfluidic control chip to the control means.

In some embodiments, the methods may further include: removing the needle from the reaction solution storage chamber to separate the control means from the microfluidic control chip; preparing a replacement microfluidic control chip that includes at least one reaction solution storage chamber sealed with a sealing tape; and inserting the needle through the sealing tape of the replacement microfluidic control chip such that the end of the needle is disposed in the reaction solution storage chamber of the replacement microfluidic control chip, so as to connect the replacement microfluidic control chip to the control means.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
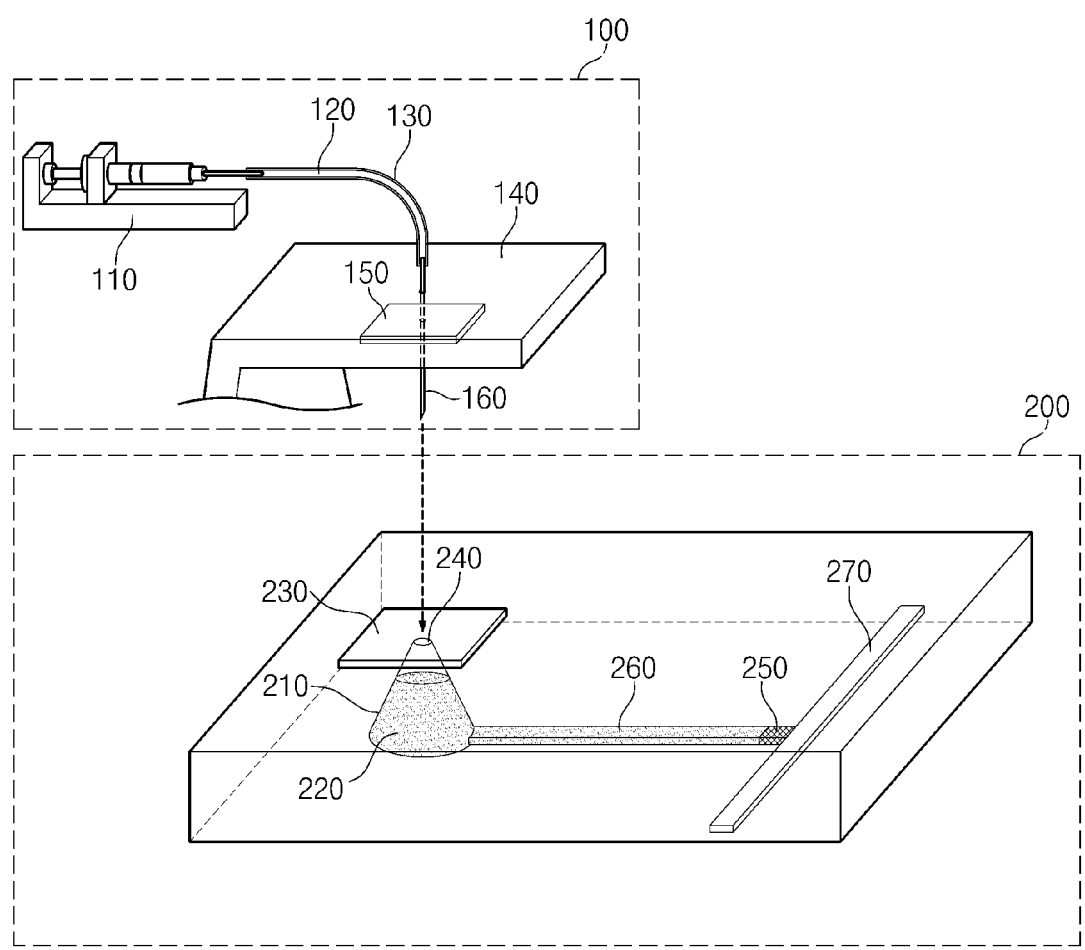
FIG. 1 is a perspective view illustrating a microfluidic control apparatus according to an embodiment of the present invention.
Figure 2:
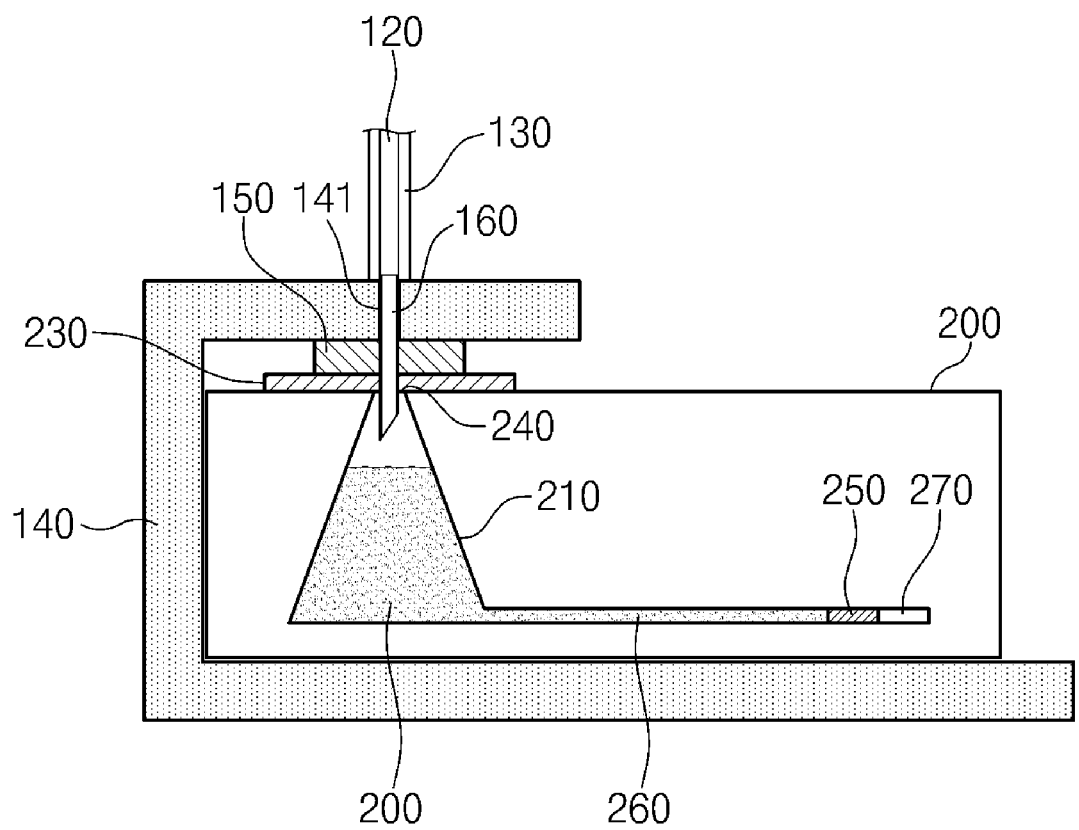
FIG. 2 is a cross-sectional view illustrating a portion of the microfluidic control apparatus of FIG. 1.

FIG. 1 is a perspective view illustrating a microfluidic control apparatus according to an embodiment of the present invention. FIG. 2 is a cross-sectional view illustrating a portion of the microfluidic control apparatus of FIG. 1.

Referring to FIGS. 1 and 2, the microfluidic control apparatus according to the present embodiment includes a microfluidic control chip 200 and a control means 100 that controls the microfluidic control chip 200.

The microfluidic control chip 200 includes at least one reaction solution storage chamber 210, a sealing tape 230 sealing the reaction solution storage chamber 210, a branch microchannel 260 having a first end that is connected to the reaction solution storage chamber 210, a main microchannel 270 connected to a second end of the branch microchannel 260, and a stop valve 250 disposed between the second end of the branch microchannel 260 and the main microchannel 270.

The control means 100 includes a tube 130 through which a working fluid 120 flows, a needle 160 connected to a first end of the tube 30 and penetrating the sealing tape 230, a pump 110 connected to a second end of the tube 130 to pump the working fluid 120, a sealing elastic plate 150 being in contact with the sealing tape 230 to firmly fix the needle 160, and a fixture 140 being in contact with the sealing elastic plate 150 to fix the sealing elastic plate 150.

Figure 3A:
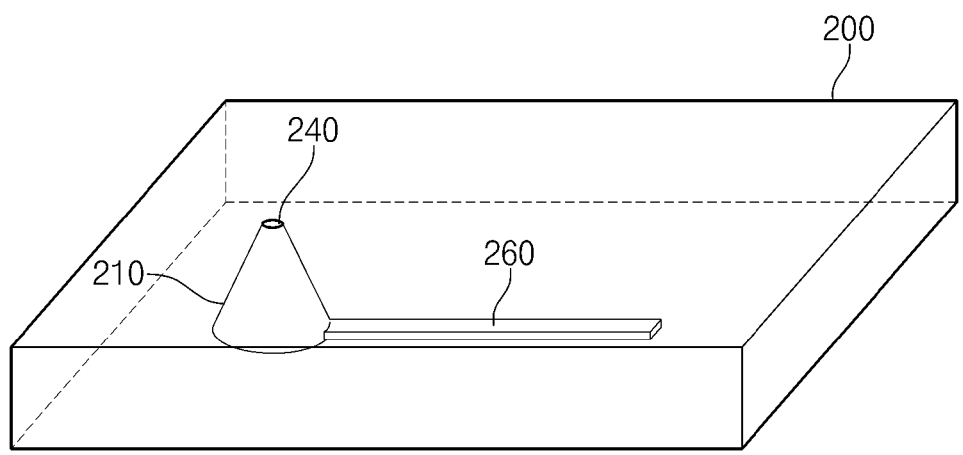
FIGS. 3A to 3C are perspective views illustrating various reaction solution storage chambers according to embodiments of the present invention.
Figure 3B:
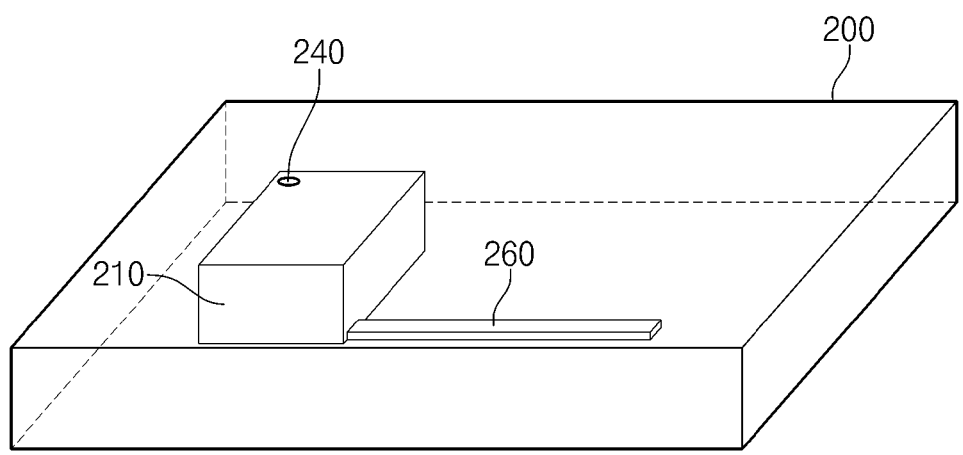
Figure 3C:
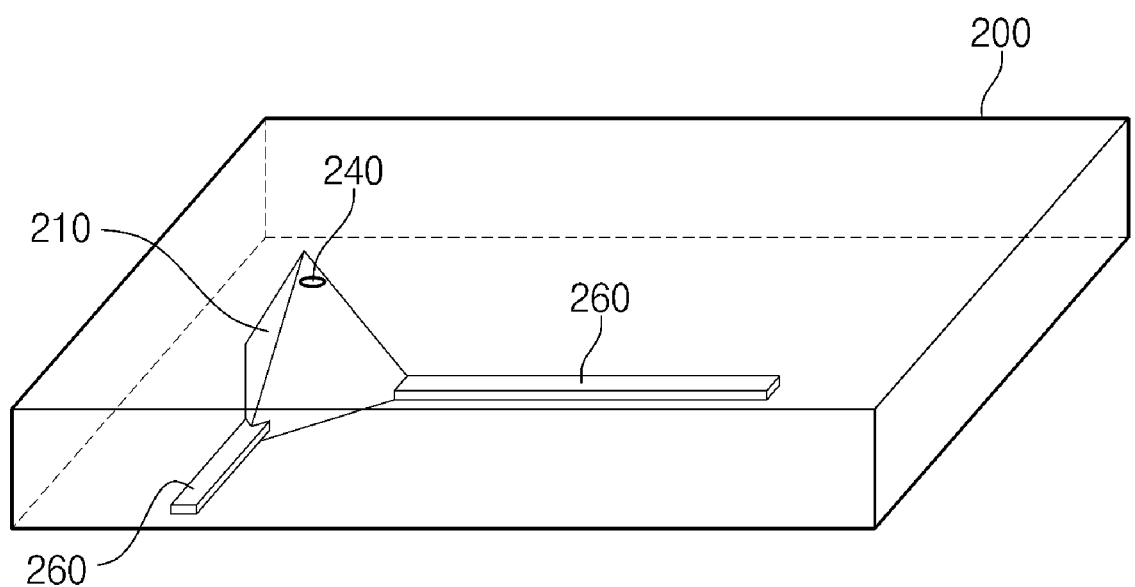

The reaction solution storage chamber 210, disposed in the microfluidic control chip 200, is used to store a reaction solution 220 that is used as a microfluid. The reaction solution storage chamber 210 may have any shape that is adapted for storing the reaction solution 220. For example, the reaction solution storage chamber 210 may have a three dimensional shape for storing the reaction solution 220. FIG. 3A is a perspective view illustrating the reaction solution storage chamber 210 that has a cone shape. FIG. 3B is a perspective view illustrating the reaction solution storage chamber 210 that has a square tank shape. FIG. 3C is a perspective view illustrating the reaction solution storage chamber 210 that has a tetrahedron shape.

The microfluidic control chip 200 may have a plate shape that has a predetermined thickness between its upper and lower surfaces, but the shape is not limited thereto. The reaction solution storage chamber 210 and the branch microchannel 260 are disposed in the microfluidic control chip 200.

The reaction solution storage chamber 210 is disposed between the upper and lower surfaces of the microfluidic control chip 200.

A first side of the reaction solution storage chamber 210 is provided with an opening 240 into which the needle 160 is inserted. The opening 240 is directed to the upper surface of the microfluidic control chip 200, but the direction is not limited thereto. The needle 160 will be described later.

The reaction solution 220 is stored in the reaction solution storage chamber 210. One portion of the reaction solution storage chamber 210 is filled with the reaction solution 220, and the other portion of the reaction solution storage chamber 210 is filled with air or a predetermined gas, e.g., with an inert gas having a low reactivity.

The reaction solution 220 is provided through the branch microchannel 260 and the main microchannel 270. The reaction solution 220 may be any material depending on the purpose of the main microchannel 270.

The opening 240 of the reaction solution storage chamber 210 is provided with the sealing tape 230 that seals the opening 240. Since both air and the reaction solution 220 that fills the reaction solution storage chamber 210 are fluids, the reaction solution 220 and the air may leak when the reaction solution storage chamber 210 is not sealed. Thus, the sealing tape 230 is used to seal the opening 240 without the leakage.

The sealing tape 230 includes an adhesive material that is used to seal the opening 240. The sealing tape 230 may be a double-sided adhesive tape, or adhesive is applied at least to a surface of the sealing tape 230 contacting the reaction solution storage chamber 210. Adhesive may be applied even to the opposite surface to the surface contacting the reaction solution storage chamber 210.

A second side of the reaction solution storage chamber 210 is provided with the branch microchannel 260 that communicates with the reaction solution storage chamber 210. The second side of the reaction solution storage chamber 210 is a different side from the first side where the opening 240 is disposed, and is not limited only to the opposite side to the first side where the opening 240 is disposed. The main microchannel 270 is connected to the reaction solution storage chamber 210 in a different region from a region where the opening 240 is disposed. For example, the main microchannel 270 may be connected to a lower lateral surface of the reaction solution storage chamber 210.

The branch microchannel 260 is a path where the reaction solution 220 flows to the main microchannel 270. The reaction solution storage chamber 210 and the main microchannel 270 communicate with each other through the branch microchannel 260 such that the reaction solution 220 of the reaction solution storage chamber 210 arrives at the main microchannel 270 through the branch microchannel 260.

The branch microchannel 260 has a pipe shape with a circular or polygonal cross section, and its first end is connected to the reaction solution storage chamber 210, and its second end is connected to a lateral portion of the main microchannel 270.

Since the branch microchannel 260 has a pipe shape with a circular or polygonal cross section, the reaction solution 220 can flow in the branch microchannel 260. The second end of the branch microchannel 260 is connected to a lateral surface of the main microchannel 270.

The stop valve 250 is disposed at the second end of the branch microchannel 260, that is, at a region where the branch microchannel 260 meets the main microchannel 270. The stop valve 250 prevents the reaction solution 220 from flowing to the region where the branch microchannel 260 meets the main microchannel 270. That is, the region where the branch microchannel 260 meets the main microchannel 270 is closed according to operation of the stop valve 250, so as to adjust the flow of the reaction solution 220.

The stop valve 250 may be a microvalve that prevents the reaction solution 220 from flowing to the main microchannel 270.

The control means 100 controls the flowing of the reaction solution 220. The control means 100 is an element that controls the microfluidic control chip 200, and connected to the microfluidic control chip 200.

The control means 100 supplies the working fluid 120 through the needle 160 that is connected to the opening 240 of the reaction solution storage chamber 210, so as to control the microfluidic control chip 200. The control means 100 is disposed such that the needle 160 is installed at the opening 240 of the reaction solution storage chamber 210. The control means 100 may be provided to the upper side of the microfluidic control chip 200 through with the tube 130, but the present invention is not limited thereto.

The control means 100 includes the tube 130 through which the working fluid 120 flows, and the needle 160 that is connected to the first end of the tube 130.

The tube 130 is hollowed, through which the working fluid 120 flows. The tube 130 may be formed of ductile material, so that the tube 130 can be bent at a predetermined level, and the position of the tube 130 can be adjusted. Alternatively, the tube 130 may be formed of rigid material.

The first end of the tube 130 is connected to the needle 160 that communicates with the tube 130. The needle 160 has a pipe shape along which the working fluid 120 moves.

The working fluid 120 may be liquid or gas, such as air, inert gas, water, oil, and a combination thereof. The working fluid 120 is not mixed with the reaction solution 220.

The flow rate of the working fluid 120 may be varied according to whether the working fluid 120 is a single fluid or a mixed fluid. Thus, whether a working fluid is a single fluid or a mixed fluid is determined according to the type of a microfluidic control apparatus.

The needle 160 has a sharp front end to penetrate the sealing tape 230 when applying a force to the sealing tape 230 in a predetermined direction. The needle 160 may be formed of metal.

The side of the sealing tape 230 facing the control means 100 is provided with the sealing elastic plate 150 that firmly fixes the needle 160 and seals, together with the sealing tape 230, the needle 160 so as to prevent the leakage of the reaction solution 220. The sealing elastic plate 150 has a surface that is in contact with the sealing tape 230, so that there is no gap between the sealing tape 230 and the sealing elastic plate 150. The surface of the sealing tape 230 facing the sealing elastic plate 150 may be provided with adhesive that firmly fixes the sealing tape 230 to the sealing elastic plate 150.

Another surface of the sealing elastic plate 150 is provided with the fixture 140 that fixes the sealing elastic plate 150.

The fixture 140 is provided with a hole 141 through which the needle 160 passes. Thus, the front end of the needle 160 sequentially passes through the fixture 140, the sealing elastic plate 150, and the sealing tape 230.

One side of the fixture 140 may be provided with a loading part (not shown) that is extended and bent, so that the microfluidic control chip 200 is placed on the loading part. Referring to FIG. 2, one side of the fixture 140 is provided with a loading part that is extended and bent downward, and then, bent again and extended in parallel to the lower surface of the microfluidic control chip 200, so that the microfluidic control chip 200 is placed on the loading part.

When the microfluidic control chip 200 is brought in close contact with the control means 100 through the fixture 140, the sealing elastic plate 150 prevents the working fluid 120 from leaking out of the tube 130.

The sealing elastic plate 150 is formed of elastic material that may be one of silicone rubber, acryl rubber, fluoro rubber, hypalon rubber, butyl rubber, nitrile rubber, butadiene rubber, chloroprene rubber, and poly-dimethyl siloxane.

Since the sealing elastic plate 150 has elasticity, the needle 160 passes through the sealing elastic plate 150 when a force is applied to the needle 160 in a predetermined direction. The elastic force of the sealing elastic plate 150 removes a gap between the needle 160 and the sealing elastic plate 150. Thus, the needle 160 is firmly fixed, and the leakage of the reaction solution 220 is prevented.

As described above, the needle 160 penetrates the sealing tape 230, and the front end of the needle 160 is disposed in the reaction solution storage chamber 210 in which the reaction solution 220 is stored. That is, the needle 160 protrudes from the sealing elastic plate 150, and the needle 160 may have a protrusion length that is greater than the thickness of the sealing tape 230 and less than the height of the reaction solution storage chamber 210.

The opening 240 of the reaction solution storage chamber 210 may have a diameter that is greater than the outer diameter of the needle 160. The opening 240 should be open enough for the needle 160 to pass through. Thus, when the opening 240 of the reaction solution storage chamber 210 is not circular, the minimum distance of the opening 240 should be greater than the outer diameter of the needle 160. However, the opening 240 is minimized within a range where the needle 160 is allowed to pass through the opening 240, thus minimizing the leakage of the reaction solution 220.

The second end of the tube 130 is provided with the pump 110 that pumps the working fluid 120.

The pump 110 may have a cylinder shape. Furthermore, a motor may be attached to the cylinder shape of the pump 110. The motor may be any motor that minutely applies a force to the working fluid 120.

When the pump 110 pumps the working fluid 120, the working fluid 120 flows to the tube 130 and the needle 160. The flow of the working fluid 120 is transmitted through the needle 160 to the reaction solution 220 of the reaction solution storage chamber 210, so that the reaction solution 220, as a microfluid, flows to the branch microchannel 260.

When the stop valve 250 provided to the second end of the branch microchannel 260 is opened, the branch microchannel 260 communicates with the main microchannel 270. Thus, the reaction solution 220 flows through the main microchannel 270.

On the contrary, when the stop valve 250 is closed, the branch microchannel 260 does not communicate with the main microchannel 270 although the pump 110 pumps the working fluid 120. Thus, the reaction solution 220 does not flow to the main microchannel 270.

Since the main microchannel 270 is a very narrow pipe, the amount of the reaction solution 220 passing through the main microchannel 270 is very small, so that the reaction solution 220, as a microfluid, passes through the main microchannel 270.

As a result, the moving of the working fluid 120 by the pump 110 of the control means 100 is transmitted through the needle 160 to the reaction solution 220 of the reaction solution storage chamber 210, so that the reaction solution 220 flows to the main microchannel 270 without the leakage of the reaction solution 220. The microfluidic control apparatus according to the present invention is configured to simply form fluid connection between the microfluidic control chip 200 and the control means 100 without the leakage of the reaction solution 220, thus storing and driving the reaction solution 220 in the microfluidic control chip 200.

Figure 4:
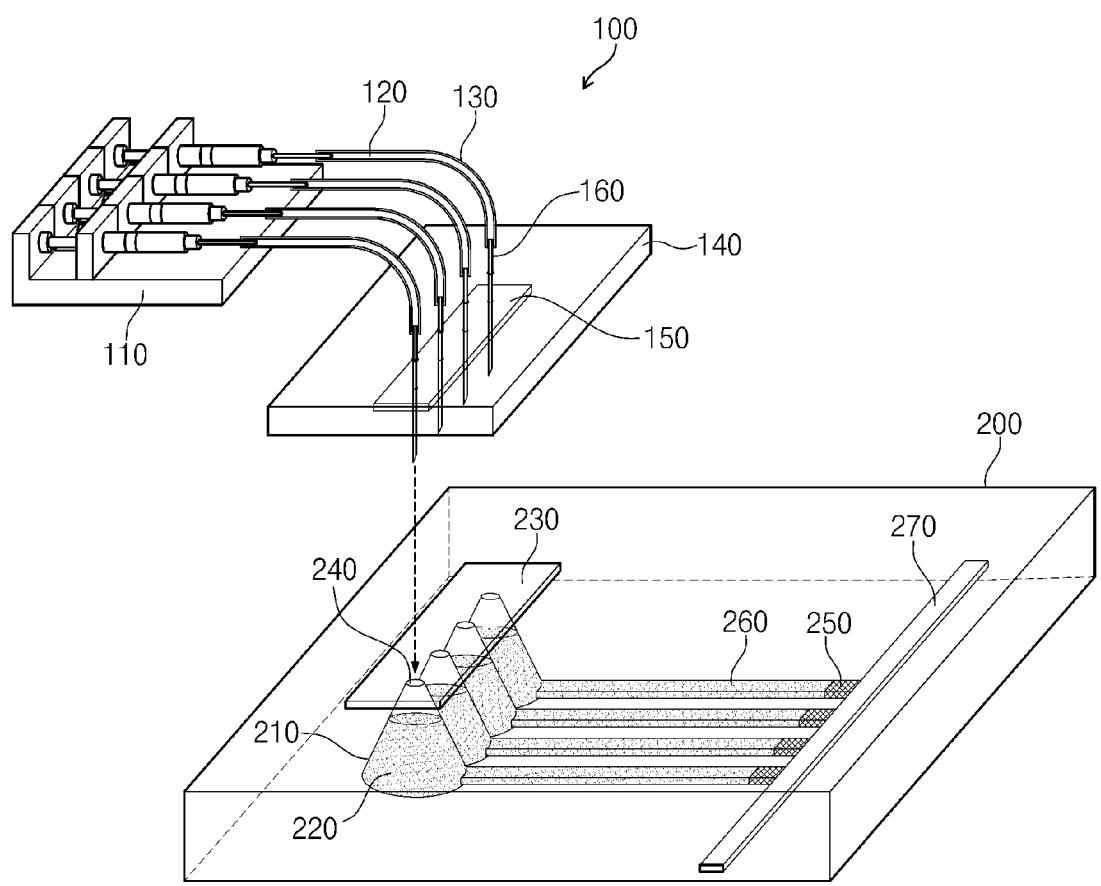
FIG. 4 is a perspective view illustrating a portion of a microfluidic control apparatus according to another embodiment of the present invention.

FIG. 4 is a perspective view illustrating a portion of a microfluidic control apparatus according to another embodiment of the present invention. Hereinafter, different parts from those of the previous embodiment will be mainly described, and parts that are not described and illustrated are the same as those of the previous embodiment.

Referring to FIG. 4, the microfluidic control apparatus according to the present embodiment includes the reaction solution storage chamber 210 that is provided in quadruplicate.

When the reaction solution 220 is provided in plurality, and the reaction solutions 220 are different types of solutions, the reaction solution storage chambers 210 simultaneously or sequentially control the reaction solutions 220. The number of the reaction solution storage chambers 210 may be varied.

The sealing tape 230 is attached to the openings 240 of the reaction solution storage chambers 210, so as to seal the reaction solution storage chambers 210 without the leakage of the reaction solutions 220. The needle 160 is provided in plurality, which penetrate the sealing tape 230, respectively.

The tube 130 is connected to each of the needles 160 to supply the working fluid 120 from the pump 110 that is connected to the tube 130.

The reaction solution storage chambers 210 may be provided respectively with the reaction solutions 220 that may be the same or different from each other. That is, the reaction solution storage chambers 210 may be provided respectively with two or more types of the reaction solutions 220.

Each of the reaction solution storage chambers 210 is provided with the branch microchannel 260 that is connected to the main microchannel 270 with the stop valve 250 therebetween. Accordingly, the reaction solutions 220 are provided as microfluids to the main microchannel 270 from the reaction solution storage chambers 210. When two or more types of the reaction solutions 220 are provided to the main microchannel 270, the reaction solutions 220 may be mixed in the main microchannel 270.

The stop valves 250 prevent or allow the reaction solutions 220 from flowing or to flow to the main microchannel 270 from the branch microchannels 260.

The pumps 110, connected respectively to the tubes 130, operate to flow the reaction solutions 220 to the main microchannel 270. At this point, the respective pumps 110 may operate independently, simultaneously, or sequentially. The order or time of the operations of the respective pumps 110 may be appropriately varied according to the reaction solutions 220 that are moved to the main microchannel 270.

The reaction solution storage chamber 210, the needle 160, and the pump 110 are provided in plurality, but the sealing tape 230, the sealing elastic plate 150, and the fixture 140 may be shared by the reaction solution storage chambers 210 and the needles 160. For example, the sealing tape 230 extends in a direction in which the openings 240 of the reaction solution storage chambers 210 are arranged, so as to simultaneously seal the openings 240 of the reaction solution storage chambers 210, and the sealing tape 230 is wide enough to cover the openings 240. The sealing tape 230 covers all of the openings 240 of the reaction solution storage chambers 210 to seal the reaction solution storage chambers 210. In a similar manner, the fixture 140 or the sealing elastic plate 150 extends in the direction in which the openings 240 of the reaction solution storage chambers 210 are arranged, and is disposed at a position that corresponds to the sealing tape 230.

Figure 5:
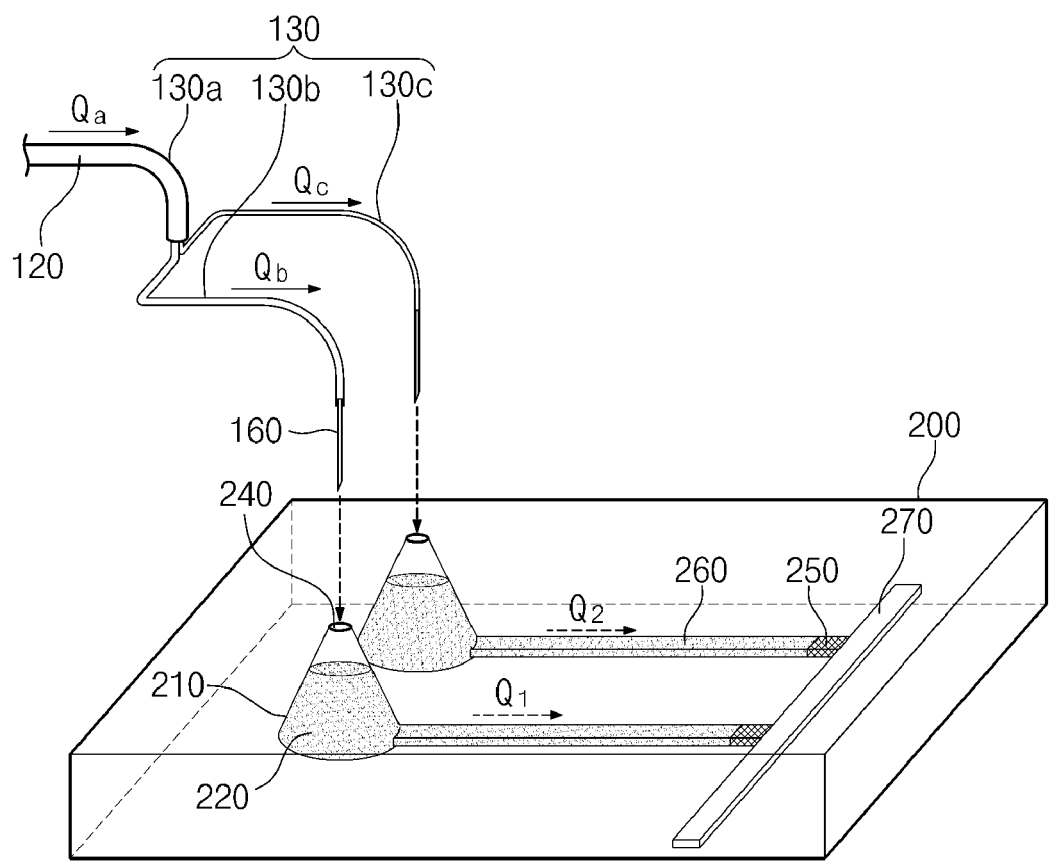
FIG. 5 is a perspective view illustrating a portion of a microfluidic control apparatus according to another embodiment of the present invention.

FIG. 5 is a perspective view illustrating a portion of a microfluidic control apparatus according to another embodiment of the present invention. Hereinafter, parts that are not described and illustrated are the same as those of the previous embodiment of FIG. 1.

Referring to FIG. 5, the microfluidic control apparatus according to the present embodiment includes the tube 130 that is connected to a single pump (not shown) and branched, and thus connected to the discrete needles 160.

In the embodiment of FIG. 4, when the microfluidic control apparatus includes the reaction solution storage chambers 210, the pumps 110 respectively control the working fluids 120 provided to the reaction solution storage chambers 210. Unlike this, in the present embodiment, the single pump is provided, and the tube 130 is branched and thus connected to the needles 160 to control branches of the working fluid 120, without respectively providing pumps for controlling the working fluid 120 to the reaction solution storage chambers 210. Although the two reaction solution storage chambers 210 are provided in the present embodiment, the present invention is not limited thereto. Furthermore, a plurality of pumps may be provided, and the reaction solution storage chambers 210 may be connected to the pumps, respectively.

The tube 130 has first ends that are connected to the needles 160, and a single second end that is connected to the pump. That is, the single tube 130 is attached through the second end to the pump, but is branched at its predetermined position, so that branches of the tube 130 are connected to the needles 160.

The tube 130, connected to the single pump, includes a single main tube 130a and sub-tubes 130b and 130c that have different inner diameters and that are formed by branching the main tube 130a. The sub-tubes 130b and 130c, having different inner diameters, generate different flow resistances, so that branches of the working fluid 120 have different flow rates.

That is, a flow rate $Q_a$ of the main tube 130a is divided into flow rates $Q_b$ and $Q_c$ respectively of the sub-tubes 130b and 130c that have different inner diameters. A ratio $Q_b/Q_c$ may be adjusted by controlling the ratio of the inner diameters of the sub-tubes 130b and 130c. In the present embodiment, $Q_a=Q_b+Q_c$, $Q_1=Q_b$, and $Q_2=Q_c$, where $Q_1$ and $Q_2$ are flow rates in the microfluidic control chip 200.

Accordingly, the main microchannel 270 simultaneously or sequentially receives the working fluid 120 from at least one of the sub-tubes 130b and 130c through the single pump and the stop valves 250, but the present invention is not limited thereto.

Figure 6:
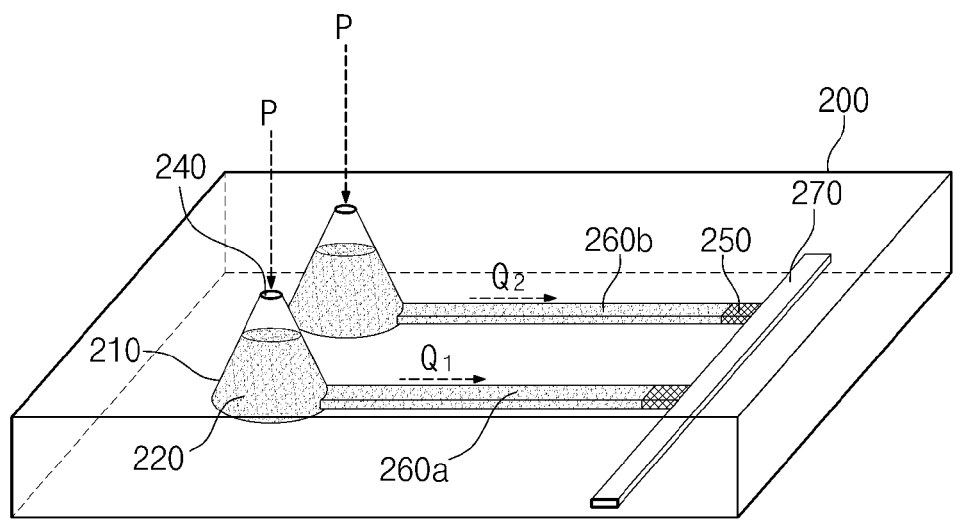
FIG. 6 is a perspective view illustrating a portion of a microfluidic control apparatus according to another embodiment of the present invention.

FIG. 6 is a perspective view illustrating a portion of a microfluidic control apparatus according to another embodiment of the present invention. Hereinafter, parts that are not described and illustrated are the same as those of the embodiment of FIG. 1.

Referring to FIG. 6, the microfluidic control apparatus according to the present embodiment may include branch microchannels 260a and 260b that have different shapes and sizes.

The reaction solution storage chambers 210, provided to the microfluidic control apparatus, are connected to the branch microchannels 260a and 260b that may be different or identical in geometric size such as channel cross-section and diameter.

The branch microchannels 260a and 260b are different in geometric size to form a difference between the flow resistances of microfluids that flow along the branch microchannels 260a and 260b. For example, when both the branch microchannels 260a and 260b are circular, and when the diameter of any one of the branch microchannels 260a and 260b is greater than the other, the one of the branch microchannels 260a and 260b having the greater diameter has the less flow resistance. Thus, the microfluid in the one of the branch microchannels 260a and 260b having the greater diameter is greater than the other in flow rate.

Accordingly, even when the working fluid 120 having a predetermined pressure is provided through the single pump 110, microfluids are controlled independently. This means that even when an identical inlet pressure P is provided, the flow rates $Q_1$ and $Q_2$ may be different from each other.

Figure 7:
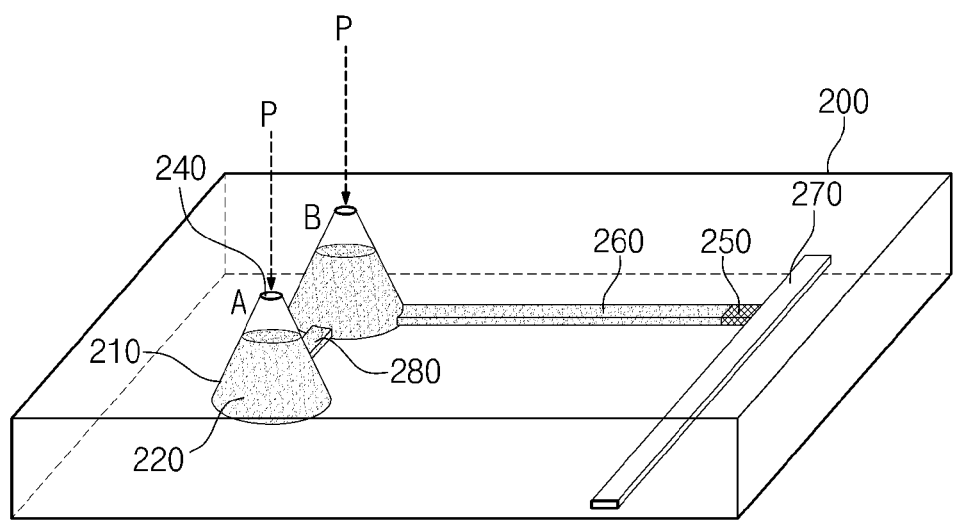
FIG. 7 is a perspective view illustrating a portion of a microfluidic control apparatus according to another embodiment of the present invention.

FIG. 7 is a perspective view illustrating a portion of a microfluidic control apparatus according to another embodiment of the present invention. Hereinafter, parts that are not described and illustrated are the same as those of the embodiment of FIG. 1.

Referring to FIG. 7, the microfluidic control apparatus according to the present embodiment may include a connection microchannel 280 that connects the reaction solution storage chambers 210 so as to mix the reaction solutions 220.

When the reaction solution storage chambers 210 are connected through the connection microchannel 280, a reaction solution A disposed in one of the reaction solution storage chambers 210, is moved to the other, so that the reaction solution A is mixed with a reaction solution B.

A method of assembling the microfluidic control apparatus according to the present invention will now be described with reference to FIG. 1.

To assemble the microfluidic control apparatus, the microfluidic control chip 200, including at least one of the reaction solution storage chambers 210 that are sealed by the sealing tape 230, is prepared first.

The microfluidic control chip 200 includes the reaction solution storage chamber 210, the branch microchannel 260 having the first end that is connected to the reaction solution storage chamber 210, and the main microchannel 270 that is connected in the second end of the branch microchannel 260.

Then, the control means 100 is prepared, which includes at least one of the needles 160, the tube 130 that is connected with the needle 160, and the pump 110 that is connected with the needle 160 and the tube 130 to pump the working fluid 120 into the tube 130 and the needle 160.

Then, the sealing tape 230 is penetrated with the needle 160 and the needle 160 is inserted into the sealing tape 230 to dispose the end of the needle 160 in the reaction solution storage chamber 210, so that the microfluidic control chip 200 is connected to the control means 100.

Before penetrating the sealing tape 230 with the needle 160 to dispose the end of the needle 160 in the reaction solution storage chamber 210, the sealing elastic plate 140 may be prepared, and the needle 160 may be inserted through the sealing elastic plate 140. Accordingly, the needle 160 is inserted into the sealing elastic plate 140, then into the sealing tape 230, and finally, the sealing elastic plate 140 is in contact with the sealing tape 230.

The microfluidic control chip 200 may be provided in plurality and replaced with each other. In this case, the needle 160 is removed from the reaction solution storage chamber 210 to detach the control means 100 from the microfluidic control chip 200. Then, the sealing tape 230 of the new microfluidic control chip 200 is penetrated with the needle 160, and then the needle 160 is inserted to dispose the end of the needle 160 in the reaction solution storage chamber 210, so that the new microfluidic control chip 200 is connected to the control means 100. Accordingly, the replacing of the microfluidic control chip 200 is very simple and convenient.

As described above, the microfluidic control apparatus according to the present invention is configured to easily and conveniently connect the external control means to the microfluidic control chip in which various reaction solutions may be stored, in the state of keeping the sealing of the microfluidic control chip. Furthermore, the microfluidic control apparatus according to the present invention stores a reaction solution in the microfluidic control chip without the evaporation of the reaction solution.

In addition, according to the present invention, the movement of the working fluid formed at the control means is accurately transmitted to a reaction solution in the microfluidic control chip to cause the movement of the reaction solution, and various reaction solutions in the microfluidic control chip are sequentially or simultaneously controlled, so that flow rates of the reaction solutions can be adjusted in the microfluidic control chip, and the reaction solutions can be mixed in the microfluidic control chip.

In addition, since the microfluidic control chip is easily attached to and detached from the control means, when disposable microfluidic control chips are used in the microfluidic control apparatus according to the present invention, it is convenient to replace the disposable microfluidic control chips.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A microfluidic control apparatus comprising:
a microfluidic control chip including: at least one reaction solution storage chamber disposed within the microfluidic control chip, the chamber containing a reaction solution; at least one branch microchannel having a first end that is connected to the reaction solution storage chamber; and a main microchannel connected to a second end of the branch microchannel, wherein a microfluid of a reaction solution flows through the branch microchannel;
a sealing elastic plate and sealing tape configured to seal the reaction solution storage chamber, the sealing tape being disposed between the microfluidic control chip and an sealing elastic plate, the sealing tape and elastic plate being adjacent to the storage solution chamber and outside of the microfluidic control chip;
a working fluid that is inert relative to the reaction solution and that is in continuous fluid communication with the reaction solution; and
at least one control means that includes at least one needle penetrating the sealing elastic plate and the sealing tape and into the solution storage chamber of the microfluidic control chip, and provides the working fluid through the needle to the reaction solution storage chamber to control the flow of the microfluid without mixing with the microfluid.

2. The microfluidic control apparatus of claim 1, wherein the reaction solution storage chamber has a side that is provided with an opening sealed with the sealing tape, and another side that communicates with the first end of the branch microchannel.

3. The microfluidic control apparatus of claim 2, wherein the needle passes tightly through the sealing elastic plate to be fixed to the sealing elastic plate.

4. The microfluidic control apparatus of claim 3, wherein the sealing tape comprises one of a tape having a surface to which adhesive is applied, and a tape having both surfaces to which adhesive is applied.

5. The microfluidic control apparatus of claim 3, wherein the needle protrudes through the sealing elastic plate, a protrusion length of the needle from the sealing elastic plate is greater than a thickness of the sealing tape, and a front end of the needle is disposed in the reaction solution storage chamber.

6. The microfluidic control apparatus of claim 3, wherein the sealing elastic plate is formed of one of silicone rubber, acryl rubber, fluoro rubber, hypalon rubber, butyl rubber, nitrile rubber, butadiene rubber, chloroprene rubber, and poly-dimethyl siloxane.

7. The microfluidic control apparatus of claim 3, wherein the opening is circular and has a diameter that is greater than an outer diameter of the needle.

8. The microfluidic control apparatus of claim 3, wherein the branch microchannel having the second end is provided in plurality, and the main microchannel is connected to the second ends of the branch microchannels.

9. The microfluidic control apparatus of claim 8, wherein the microfluidic control chip comprises stop valves that are disposed between the main microchannel and the second ends of the branch microchannels.

10. The microfluidic control apparatus of claim 9, wherein the stop valve comprises a microvalve that prevents the reaction solution from flowing to the main microchannel.

11. The microfluidic control apparatus of claim 3, wherein the control means further comprises:
a tube connected to the needle, the working fluid flowing in the tube; and
a pump connected to the tube to pump the working fluid.

12. The microfluidic control apparatus of claim 11, wherein the tube comprises a single main tube, and a plurality of sub-tubes that are formed by branching the main tube and connected to a plurality of needles.

13. The microfluidic control apparatus of claim 12, wherein the sub-tubes have different inner diameters so as to have different flow rates.

14. The microfluidic control apparatus of claim 1, wherein the working fluid comprises one of air, water, oil, and a combination thereof.

15. The microfluidic control apparatus of claim 1, wherein the reaction solution storage chamber has an inner space, a portion of which is filled with the reaction solution, and a rest of which is filled with air.

16. The microfluidic control apparatus of claim 1, wherein the control means is connected in one-to-one correspondence to the reaction solution storage chamber, and reaction solutions respectively filling the reaction solution storage chambers are classified into at least two types.

17. The microfluidic control apparatus of claim 16, wherein the microfluidic control chip further comprises a connection microchannel that is disposed between the reaction solution storage chambers to mix the reaction solutions that are stored respectively in the reaction solution storage chambers.

18. The microfluidic control apparatus of claim 16, wherein the branch microchannels connected to the reaction solution storage chambers have different shapes and sizes to have different flow resistances.

19. A method comprising:
preparing a microfluidic control chip that includes at least one reaction solution storage chamber disposed within the microfluidic control chip, the chamber containing a reaction solution, a sealing elastic plate and sealing tape configured to seal the reaction solution storage chamber, the sealing tape being disposed between the microfluidic control chip and the sealing elastic plate, the sealing tape and sealing elastic plate being adjacent to the storage solution chamber and outside of the microfluidic control chip;
preparing at least one control means that includes at least one needle and a pump that is connected to the needle to pump into the needle, a working fluid that is inert relative to the reaction solution and does not mix with the reaction solution;
inserting the needle through the sealing elastic plate and the sealing tape such that an end of the needle is disposed in the reaction solution storage chamber, so as to connect the microfluidic control chip to the control means; and
activating the control means to provide pressure to the working fluid and the reaction solution, whereby the working fluid is in continuous fluid communication with the reaction solution.

20. The method of claim 19, further comprising:
removing the needle from the reaction solution storage chamber to separate the control means from the microfluidic control chip;
preparing a replacement microfluidic control chip that includes at least one reaction solution storage chamber sealed with a sealing tape;
inserting the needle through the sealing tape of the replacement microfluidic control chip such that the end of the needle is disposed in the reaction solution storage chamber of the replacement microfluidic control chip, so as to connect the replacement microfluidic control chip to the control means; and
activating the control means to provide pressure to the working fluid and the reaction solution, whereby the working fluid is in continuous fluid communication with the reaction solution.

* * * * *